US012481005B2

(12) United States Patent
Pointer et al.

(10) Patent No.: US 12,481,005 B2
(45) Date of Patent: Nov. 25, 2025

(54) SYSTEMS AND METHODS FOR DETERMINING DEGRADATION OF BATTERIES

(71) Applicant: LG ENERGY SOLUTION, LTD., Seoul (KR)

(72) Inventors: Marielle Pointer, Westborough, MA (US); Kiran Kumar, Westborough, MA (US)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/955,204

(22) Filed: Nov. 21, 2024

(65) Prior Publication Data
US 2025/0164573 A1 May 22, 2025

Related U.S. Application Data

(60) Provisional application No. 63/601,603, filed on Nov. 21, 2023.

(51) Int. Cl.
  *G01R 31/392* (2019.01)
  *G01R 31/367* (2019.01)
  *H01M 10/42* (2006.01)

(52) U.S. Cl.
  CPC ......... *G01R 31/392* (2019.01); *G01R 31/367* (2019.01); *H01M 10/4285* (2013.01)

(58) Field of Classification Search
  CPC G01R 31/392; G01R 31/367; H01M 10/4285
  See application file for complete search history.

(56) References Cited

U.S. PATENT DOCUMENTS

| | | | |
|---|---|---|---|
| 9,063,018 B1 | 6/2015 | Ghantous et al. | |
| 10,884,475 B1 * | 1/2021 | Wang | G06F 1/3296 |
| 2010/0036628 A1 * | 2/2010 | Plestid | G01R 31/382 |
| | | | 702/63 |
| 2011/0112781 A1 * | 5/2011 | Anderson | G01R 31/392 |
| | | | 702/63 |

(Continued)

FOREIGN PATENT DOCUMENTS

| | | |
|---|---|---|
| CN | 106526492 A | 3/2017 |
| JP | 2020148560 A | 9/2020 |

(Continued)

*Primary Examiner* — Ricky Go
(74) *Attorney, Agent, or Firm* — BRYAN CAVE LEIGHTON PAISNER LLP (57) ABSTRACT

Systems and methods for estimating battery degradation of a battery energy storage system (BESS) are disclosed. An iterative process is executed over a pre-defined time period divided into iterations. For each iteration, an average temperature of the BESS is determined by inputting a state of health (SOH) and charge rate into an average temperature look-up-table (LUT). The SOH for the next iteration is determined by inputting the determined average temperature into a set of cell degradation equations. The charge rate for the next iteration is derived from a usage profile which defines the charging and discharging cycles over the pre-defined time period and includes power and SOC over the pre-defined time period. The SOH of the BESS over the pre-defined time period may then be displayed on a user interface.

20 Claims, 9 Drawing Sheets

(56) References Cited

U.S. PATENT DOCUMENTS

2020/0355750 A1   11/2020  Badwekar
2023/0375623 A1*  11/2023  Jauernig ............... G01R 31/374
2025/0052709 A1*   2/2025  Kundu .................. G01M 13/02

FOREIGN PATENT DOCUMENTS

| KR | 1020170112495 A | 10/2017 |
| KR | 1020220047472 A | 4/2022 |
| KR | 10-2023-0120034 A | 8/2023 |
| KR | 10-2023-0137149 A | 10/2023 |

* cited by examiner

SYSTEMS AND METHODS FOR DETERMINING DEGRADATION OF BATTERIES

CROSS-REFERENCE TO RELATED APPLICATION

This application claims priority to and the benefit of U.S. Provisional Application 63/601,603 filed on Nov. 21, 2023, the disclosure of which is incorporated herein by reference.

TECHNICAL FIELD

The present disclosure relates to managing a battery energy storage system (BESS), and more particularly to accurately determining the state of health (SOH) of a BESS.

BACKGROUND

BESSs have become a critical component in modern energy management systems. With the increasing integration of renewable electricity sources such as wind and solar, which are inherently intermittent, energy storage solutions are necessary to ensure electrical grid stability and efficient power distribution. BESS technology allows for the storage of excess electricity during periods of low demand and discharge of scarce electricity during high demand, thereby optimizing energy usage (by reducing the curtailment of solar and wind electricity), reducing reliance on fossil fuel-based power generation such as gas turbines, and mitigating the effects of climate change by reducing the release of greenhouse gases. This capability is particularly valuable as the global transition to cleaner energy sources accelerates, and as intermittent electricity sources gain larger shares of the electricity supply mix.

Since battery cells degrade over time (also known as "fade"), accurately predicting the SOH at a point in the BESS life cycle is crucial. SOH is the overall condition of a battery after charging and discharging cycles compared to the condition of the battery when new or at beginning of life (BOL). SOH is typically expressed as a percentage and accounts for factors such as the battery's capacity, internal resistance, and ability to hold a charge. SOH helps determine the remaining useful life of the battery and its efficiency in storing and delivering power.

SUMMARY

Accordingly, the present disclosure describes a system and method for estimating the SOH of a BESS over a period of time. The present system and method may provide insight into BESS capacity fade based on historical site usage, and may offer an opportunity for users to change (or not change) their usage profile for a commissioned BESS site. Additionally, the present system and method may provide insight into BESS capacity fade for future site usage profiles ahead of time, and may thus act as an opportunity forecaster for a BESS site that is not yet commissioned.

According to one aspect, the present disclosure is directed to a system for estimating battery degradation of a BESS, comprising: a controller comprising one or more processing modules and one or more non-transitory memory storage modules storing computing instructions which when executed by the one or more processing modules is configured to: (a) execute an iterative process over a pre-defined time period, wherein the pre-defined time period is divided into a plurality of iterations, wherein each iteration of the plurality of iterations comprises: (1) determine an average temperature of the BESS for a current iteration of the plurality of iterations by inputting the following into an average temperature look-up table (LUT): a state of health (SOH) of the BESS for the current iteration and a charge rate of the BESS for the current iteration; and (2) input the determined average temperature into a set of cell degradation equations to determine a SOH of the BESS for a next iteration of the plurality of iterations.

In some cases, wherein the average temperature LUT is generated by inputting different combinations of SOH and charge rate into a thermal model.

In some cases, the controller is configured to: repeat steps (1) and (2) until a last iteration of the iterative process is executed.

In some cases, the controller is configured to: instruct a user interface (UI) to display a time series showing the SOH determined for each iteration over the pre-defined time period, wherein a horizontal axis of the time series represents time and the vertical axis of the time series represents SOH.

In some cases, the SOH for the first iteration is an initial SOH of the BESS.

In some cases, the charge rate of the BESS for the current iteration is determined based on a usage profile of the BESS over the pre-defined time period and the rated energy capacity of the BESS.

In some cases, the usage profile of the BESS over the pre-defined time period is derived from historical usage data of the BESS.

In some cases, the usage profile of the BESS over the pre-defined time period is derived from future usage data of the BESS.

In some cases, wherein the average temperature LUT includes average cycling temperatures that consider charging and discharging cycles of the BESS and average resting temperatures based on time when the BESS is not undergoing charging and discharging cycles.

In some cases, the average temperature LUT for the current iteration is generated based on a cell type and a module type of the BESS.

According to another aspect, the present disclosure is directed to a method for estimating battery degradation of a BESS, comprising: (a) executing an iterative process over a pre-defined time period, wherein the pre-defined time period is divided into a plurality of iterations, wherein each iteration of the plurality of iterations comprises: (1) determining an average temperature of the BESS for a current iteration of the plurality of iterations by inputting the following into an average temperature look-up table (LUT): a state of health (SOH) of the BESS for the current iteration and a charge rate of the BESS for the current iteration; and (2) inputting the determined average temperature into a set of cell degradation equations to determine a SOH of the BESS for a next iteration of the plurality of iterations.

It should be noted that the technical effects obtainable through the present disclosure are not limited to the above-described effects, and other effects that are not mentioned herein will be clearly understood by those skilled in the art from the following descriptions.

BRIEF DESCRIPTION OF THE DRAWINGS

The accompanying drawings illustrate exemplary aspects of the present disclosure and, together with the following detailed description, serve to provide further understanding of the technical spirit of the present disclosure. However, the present disclosure is not to be construed as being limited to the drawings.

DETAILED DESCRIPTION OF THE DISCLOSURE

The present disclosure may be variously changed and have various aspects, and the specific aspects disclosed herein in detail are used to facilitate an understanding of the present disclosure to those skilled in the art.

Therefore, it should be understood that there is no intention to limit the present disclosure to the particular aspects disclosed, and on the contrary, the present disclosure covers all modifications, equivalents, and alternatives falling within the spirit and scope of the present disclosure.

In this application, it should be understood that terms such as "include" or "have" are intended to indicate the presence of a feature, number, step, operation, component, part, or a combination thereof described on the specification, and they do not preclude the possibility of the presence or addition of one or more other features or numbers, steps, operations, components, parts or combinations thereof.

Figure 1:
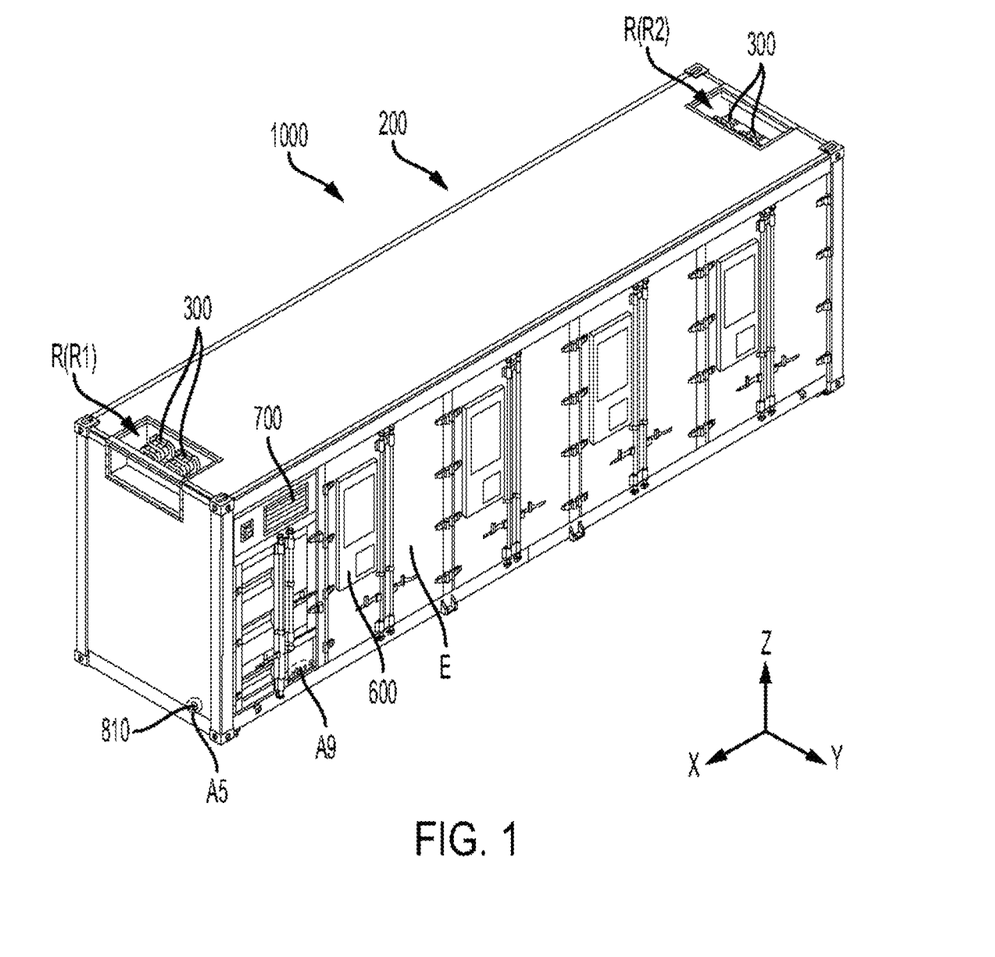
FIG. 1 is a perspective view schematically showing the configuration of a battery container in accordance with an aspect of the present disclosure.
Figure 2:
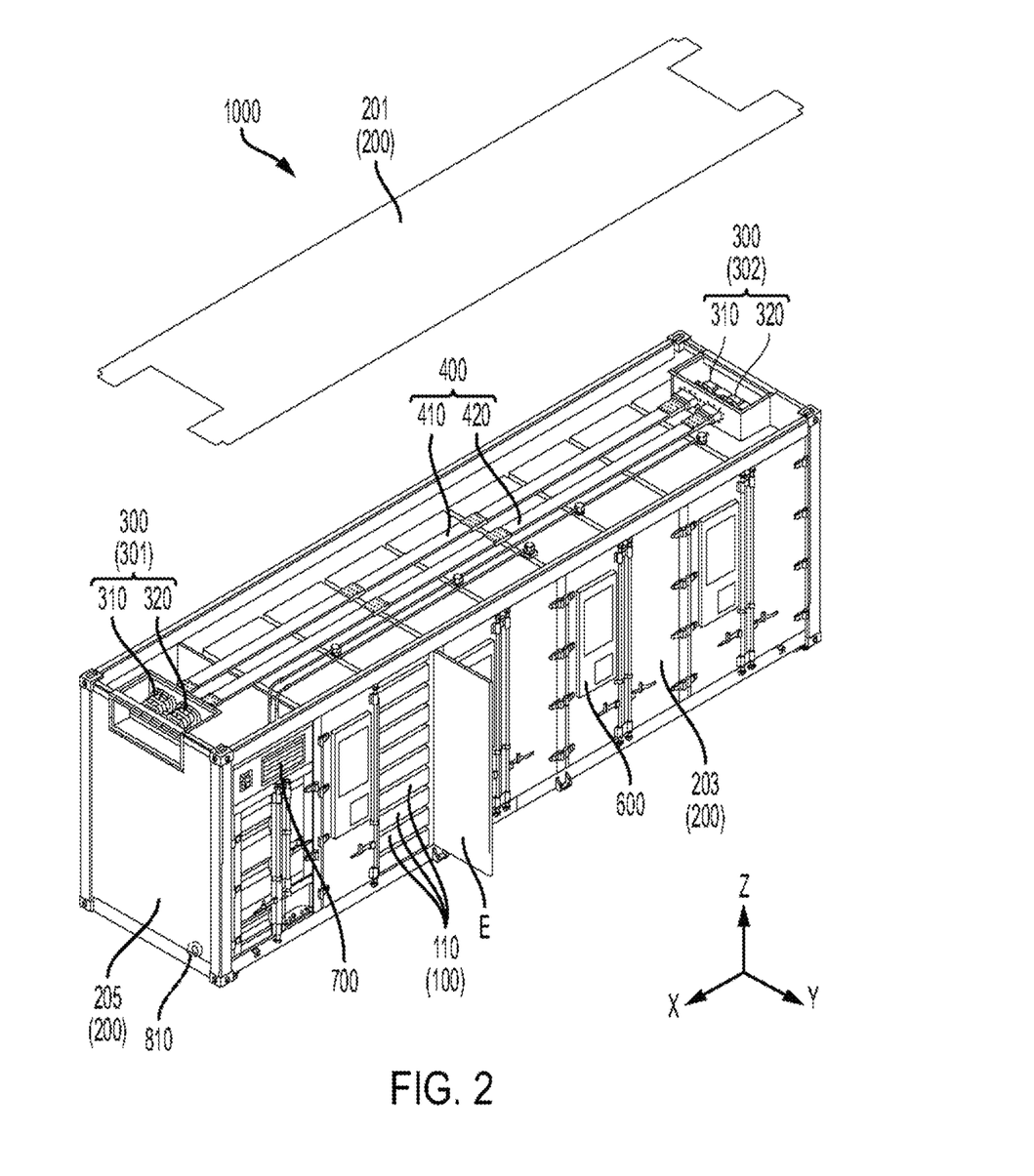
FIG. 2 is a perspective view schematically showing a form in which some components of the battery container are separated or moved according to in accordance with an aspect of the present disclosure.
Figure 3:
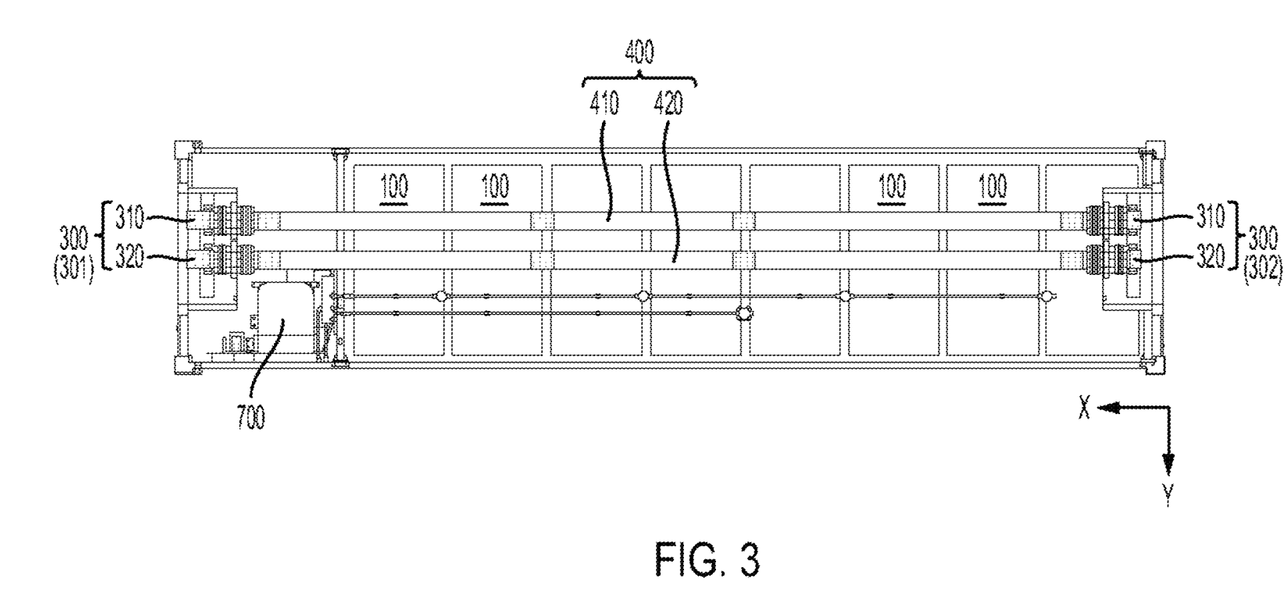
FIG. 3 is a diagram showing the internal configuration of the battery container in accordance with an aspect of the present disclosure, viewed from above.

FIG. 1 is a perspective view schematically showing the configuration of a battery container 1000 of a BESS according to an aspect of the present disclosure. Also, FIG. 2 is a perspective view schematically showing a form in which some components of the battery container 1000 are separated or moved according to an aspect of the present disclosure. FIG. 3 is a diagram showing the internal configuration of the battery container 1000 according to an aspect of the present disclosure, viewed from above.

Referring to FIGS. 1 to 3, a battery container 1000 according to the present disclosure includes a battery rack 100, a container housing 200, a main connector 300, and a main bus bar 400.

The battery rack 100 may include a plurality of battery modules 110. Here, each battery module 110 may be configured in a form in which a plurality of battery cells (secondary batteries) are accommodated in a module case. In addition, the battery modules 110 may be stacked in one direction, such as in an upper and lower direction, to form a battery rack 100. In particular, the battery rack 100 may include a rack case to facilitate stacking of the battery modules 110. In this case, a plurality of battery modules 110 may be accommodated in respective storage spaces provided in the rack case to form a module stack. In some aspects, the battery modules 110 may be arranged in other configurations, such as side-by-side or in a matrix pattern. The rack case may include features like cooling channels or structural reinforcements to support the weight of the stacked modules. In some cases, the battery rack 100 may incorporate sensors to monitor temperature, voltage, or other parameters of the battery modules 110.

The battery module 110 included in the battery rack 100 may further include a control unit such as a battery management system (BMS) for each group or certain groups. For example, a separate pack BMS may be provided for each battery module 110. In this case, each battery module 110 may be referred to as a battery pack. That is, it may be regarded that the battery rack 100 includes a plurality of battery packs. In various descriptions below, the battery module 110 may be replaced with a battery pack. In some cases, the battery rack 100 may incorporate sensors to monitor parameters like temperature, voltage, or current of the battery modules 110. The BMS for each battery module or pack may communicate with a higher-level rack BMS to coordinate overall rack performance and safety.

One or more battery racks 100 may be included in the battery container 1000. In particular, a plurality of battery racks 100 may be included in the battery container 1000. Also, the plurality of battery racks 100 may be disposed in at least one direction, for example, in a horizontal direction. For example, eight battery racks 100 may be included in the battery container 1000, and the plurality of battery racks 100 may be arranged in left and right directions (X-axis direction) inside the battery container 1000. When a plurality of battery racks 100 are included, a separate control unit, such as a rack BMS, may be provided for each battery rack 100. In this case, the rack BMS may be connected to the plurality of pack BMSs to exchange data and control the plurality of pack BMSs. Meanwhile, when the battery container 1000 includes at least one rack BMS, the rack BMS may be connected to a separate control device provided outside the battery container 1000, such as a control container. In addition, the control container may be connected to a rack BMS or a pack BMS of the battery container 1000 to control the same or exchange data with the same.

An empty space may be formed inside the container housing 200. Also, the container housing 200 may accommodate the battery rack 100 in the inner space. More specifically, the container housing 200 may be formed in a substantially rectangular parallelepiped shape, as shown in FIG. 1 and the like. In this case, the container housing 200 may include an upper housing 201, a lower housing, a front housing 203, a rear housing, a left housing 205, and a right housing around the inner space. Also, the container housing 200 may accommodate the battery rack 100 in the inner space defined by these six unit housings.

The container housing 200 may be made of a material that secures a certain level of rigidity and stably protects internal components from external physical and chemical factors. For example, the container housing 200 may be made of a metal material, such as steel, aluminum, or titanium, or may have such a metal material. In some aspects, the container housing 200 may be constructed from composite materials like carbon fiber reinforced polymers or fiberglass, which offer high strength-to-weight ratios. The housing may also incorporate corrosion-resistant alloys like stainless steel or galvanized steel in areas exposed to harsh environmental conditions. In some cases, the container housing 200 may utilize a combination of materials, such as a steel frame with aluminum panels, to balance strength, weight, and cost considerations. Additionally, the housing may include specialized coatings or treatments, such as powder coating or anodizing, to enhance durability and weather resistance.

The container housing may have a size identical or similar to the size of a shipping container. In addition, the container housing may follow the standards of a shipping container predetermined according to the ISO standards or the like. For example, the container housing may be designed with identical or similar dimensions as a 20-foot container or a 40-foot container. However, the size of the container housing may be appropriately designed depending on the situation. In particular, the size or shape of the container housing may be set variously according to the construction scale, shape, topography, or the like of a system to which the battery container is applied, such as an energy storage system. The present disclosure may not be limited by to the size or shape of the container housing. In some aspects, for example, the container housing may have other shapes such as cylindrical, spherical, or custom polygonal shapes. The housing may also be modular, allowing for expansion or contraction based on capacity needs. In some cases, the container housing may incorporate features like sloped roofs for water runoff or reinforced walls for increased durability in harsh environments.

The main connector 300 may be configured to be electrically connected to the outside. That is, with respect to the battery container 1000, the main connector 300 may be configured to be connected to another component outside the battery container 1000, for example another battery container 1000 or a control container equipped with a control unit such as a battery system controller (BSC).

The main connector 300 may be located on at least one side of the container housing 200. For example, the main connector 300 may be located on the left or right side of the container housing 200. Moreover, a plurality of main connectors 300 may be included in the battery container 1000. For example, as shown in FIGS. 2 and 3, the main connector 300 may include two main connectors 300, namely a first connector 301 and a second connector 302.

The plurality of main connectors 300 may be located on different sides of the container housing 200. Moreover, the plurality of main connectors 300 may be located on opposite sides of the container housing 200. For example, as shown in FIGS. 1 to 3, the first connector 301 and the second connector 302 may be provided on the left and right sides of the container housing 200, respectively. In some aspects, the main connectors 300 may be located on the roof or floor of the container housing 200. In some cases, the main connectors 300 may be positioned at corners or edges of the container housing 200. The main connectors 300 may also be arranged in various configurations, such as in a staggered pattern or aligned vertically along the sides of the container housing 200. In some implementations, additional main connectors may be included on the front or back sides of the container housing 200 to provide further connection options.

The main bus bar 400 may be configured to transmit power. In particular, the main bus bar 400 may serve as a path through which a charging power and a discharging power for the battery rack 100 included in the corresponding battery container 1000 are transmitted. To this end, the main bus bar 400 may be electrically connected to each terminal of the battery module 110 provided in the battery rack 100. Also, the main bus bar 400 may be connected to the main connector 300. Accordingly, the main bus bar 400 may serve as a path through which a charging power is transferred from the main connector 300 to the battery module 110. In addition, the main bus bar 400 may serve as a path through which a discharging power is transmitted from the battery module 110 to the main connector 300.

Moreover, the main bus bar 400 may function as a power transmission line between the plurality of main connectors 300. To this end, different ends of the main bus bar 400 may be connected to different main connectors 300. For example, the main bus bar 400 may be a power line elongated in one direction, for example in left and right directions. In this case, both ends of the main bus bar 400 may be connected to different main connectors 300, for example the first connector 301 and the second connector 302. Also, the main bus bar 400 may serve as a path for transmitting power between different main connectors 300, for example between the first connector 301 and the second connector 302.

The main bus bar 400 may include two unit bus bars, namely a positive electrode bus bar 410 and a negative electrode bus bar 420, in order to function as a power transmission path. The positive electrode bus bar 410 may be connected to a positive electrode terminal of the battery rack 100 or a positive electrode terminal of the battery module 110 included therein. Also, the negative electrode bus bar 420 may be connected to a negative electrode terminal of the battery rack 100 or a negative electrode terminal of the battery module 110 included therein.

In addition, the main connector 300 may be separately provided at each end of the positive electrode bus bar 410 and the negative electrode bus bar 420. For example, the first connector 301 and the second connector 302 may be provided at the left and right ends of the positive electrode bus bar 410, respectively. The first connector 301 and the second connector 302 provided at both ends of the positive electrode bus bar 410 may be a positive electrode connector 310. Also, the first connector 301 and the second connector 302 may be provided at the left end and the right end of the negative electrode bus bar 420, respectively. The two connectors provided at both ends of the negative electrode bus bar 420, namely the first connector 301 and the second connector 302, may all be negative electrode connectors 320.

In addition, the battery container 1000 according to the present disclosure may include a cable cover CC. The cable cover CC may be configured to surround a cable connected to the battery container 1000. For example, a plurality of power cables may be connected to the terminal bus bar TB to transfer power. In this case, the cable cover CC may be located at one end, for example a lower end, of the terminal cover TC to protect a plurality of power cables connected to the terminal bus bar TB. Alternatively, the battery container 1000 may be connected to a data cable to exchange various data with other external components, such as the control container 2000. In this case, the cable cover CC may be configured to protect data cables or the like connected to the battery container 1000 from the outside.

In particular, the cable cover CC may include a cable tray CC1 and a tray cover CC2. The cable tray CC1 may include a body portion attached to an outer wall of the container housing 200 and a sidewall portion protruding outward from an edge of the body portion. For example, the sidewall portion may be formed to protrude to the left from the front edge and the rear edge of the body portion. The tray cover CC2 may be coupled to the end of the sidewall portion protruding from the body portion of the cable tray CC1 to form an empty space therein together with the body portion and the sidewall portion. In particular, this empty space may be formed in a hollow shape. Accordingly, the cable may extend outward from the battery container 1000 through the empty space of the cable cover CC. In addition, the cable extending to the outside may be connected to other external components, such as the control container 2000 or another battery container 1000.

According to this aspect, by minimizing the exposure of the cable extending from the battery container 1000 to the outside, it is possible to protect the cable and prevent damage or breakage of the cable. Moreover, the cable cover CC is configured to have a hollow formed downward at the side surface of the container housing, so that the cable accommodated inside may be exposed downward to the outside. In this case, it may be advantageous for installation, management, and undergrounding of the cable.

In addition, the battery container 1000 according to the present disclosure may further include an air conditioning module 600 as shown in FIGS. 1 and 2. The air conditioning module 600 may be configured to regulate air inside the container housing 200. In particular, the air conditioning module 600 may control the temperature state of an internal air. Moreover, the air conditioning module 600 may be configured to circulate air inside the container housing 200 to control the temperature of various electronic equipment such as the battery rack 100 or the rack BMS included in the battery container 1000 within a certain range. In particular, the air conditioning module 600 may cool the air inside the container housing 200. For example, the air conditioning module 600 may be configured to absorb heat from the air inside the container housing 200 and discharge the heat to the outside. In addition, the air conditioning module 600 may be configured to remove dust or foreign substances from the air inside the container housing 200.

Representatively, the air conditioning module 600 may include at least one HVAC (Heating, Ventilation, & Air Conditioning). For example, the battery container 1000 according to the present disclosure may include four HVACs. The HVAC may allow air to circulate inside the container housing 200. In this case, the temperature of the battery rack 100 may be lowered, and a temperature difference between the battery racks 100 included in the container housing 200 or between the battery modules 110 may be reduced.

In particular, the container housing 200 may include at least one door, as indicated by E in FIGS. 1 and 2, to facilitate installation, maintenance, or repair of the battery rack 100. For example, the container housing 200 may have eight doors E on the front side. Also, two doors E may be opened and closed as a pair in a casement form. In addition, such a door E may be additionally provided on another part of the container housing 200, for example at the rear surface.

In this way, when the door E is provided to the container housing 200, the HVAC may be installed in the door E of the container housing 200. For example, when two doors E are configured as a pair, the HVAC may be provided to one of the two doors E. In addition, the HVAC, namely the air conditioning module 600, may be configured to penetrate the container housing 200, particularly the door E. In this case, one surface of the air conditioning module 600 may be exposed to the outside of the container housing 200, and the other surface of the air conditioning module 600 may be exposed to the inside of the container housing 200. Accordingly, the inner surface of the air conditioning module 600 may contact the internal air of the container housing 200 to absorb heat, and the outer surface of the air conditioning module 600 may contact the external air of the container housing 200 to discharge heat.

The air conditioning module 600 may be configured to prevent direct contact between internal air and external air. That is, the air conditioning module 600 may be configured to prevent internal air from being discharged to the outside and to prevent external air from being introduced into the inside. Therefore, even if the temperature inside the container housing 200 rises, the air conditioning module 600 may absorb only heat from the internal air and discharge the heat to the outside without directly discharging the internal air to the outside. According to this aspect, even if a fire or toxic gas is generated inside the battery container 1000, it is possible to prevent the fire or toxic gas from being discharged to the outside and causing damage to other devices such as other nearby battery containers 1000 or workers at the outside.

In addition, the battery container 1000 according to the present disclosure may further include a venting module 700 as shown in FIGS. 1 and 2. The venting module 700 may be configured to discharge gas inside the container housing 200 to the outside. In addition, the venting module 700 may introduce an external air of the container housing 200 into the inside. Accordingly, the venting module 700 may function as a ventilation device. That is, the venting module 700 may exchange or circulate gas between the inside and the outside of the container housing 200.

In particular, the venting module 700 may be configured to operate in an abnormal situation, such as when a venting gas or fire is generated in a specific battery module 110. Moreover, the venting module 700 may be configured to discharge gas to the outside when the gas or the like is generated inside the container housing 200 due to a thermal runaway phenomenon or the like of the battery rack 100. Moreover, the venting module 700 may be configured to be in a closed state in a normal state and be switched to an open state in an abnormal state such as a thermal runaway situation. In this case, since the venting module 700 performs active ventilation, the venting module 700 may be referred to as an AVS (Active Ventilation System) or include such a system.

In this case, it is possible to prevent a larger problem such as an explosion from occurring due to an increase in the internal pressure of the battery container 1000. In addition, in this case, by rapidly discharging a combustible gas inside the container housing 200 to the outside, it is possible to lower the possibility of a fire in the battery container 1000 or delay the occurrence of a fire, and the scale of a fire may be reduced.

Meanwhile, in the aspect where both the venting module 700 and the air conditioning module 600 are included, in a normal situation, the venting module 700 may not operate, but the air conditioning module 600 may operate. In this case, in the process of cooling, it is possible to prevent foreign substances or moisture from flowing into the container housing 200 through the venting module 700. According to this aspect, since the air conditioning module 600, the venting module 700, and the like are included in the battery container 1000, just by transporting and installing the battery container 1000, the air conditioning module 600 or the venting module 700 may be transported and installed together. Therefore, on-site installation work for installing the energy storage system may be minimized, and the connection structure may be simplified.

In this aspect, the air conditioning module 600 and/or the venting module 700 may operate under the control of the control container 2000. Alternatively, the air conditioning module 600 and/or the venting module 700 may be controlled by a control unit included in the battery container 1000, such as a rack BMS that controls the charge/discharge operation of each battery rack 100 or another separate control unit.

In addition, the battery container 1000 according to the present disclosure may include at least one sensor and provide sensing information to the rack BMS included in the battery container 1000, another separate control unit, or the control container 2000. For example, a temperature sensor, a smoke sensor, an $H_2$ sensor, and/or a CO sensor may be included in the battery container 1000. In this case, the operation of the air conditioning module 600 and/or the venting module 700 may be controlled based on the information sensed by these sensors. The battery container 1000 may further include a firefighting connector 810 to a firefighting module (not shown).

Figure 4:
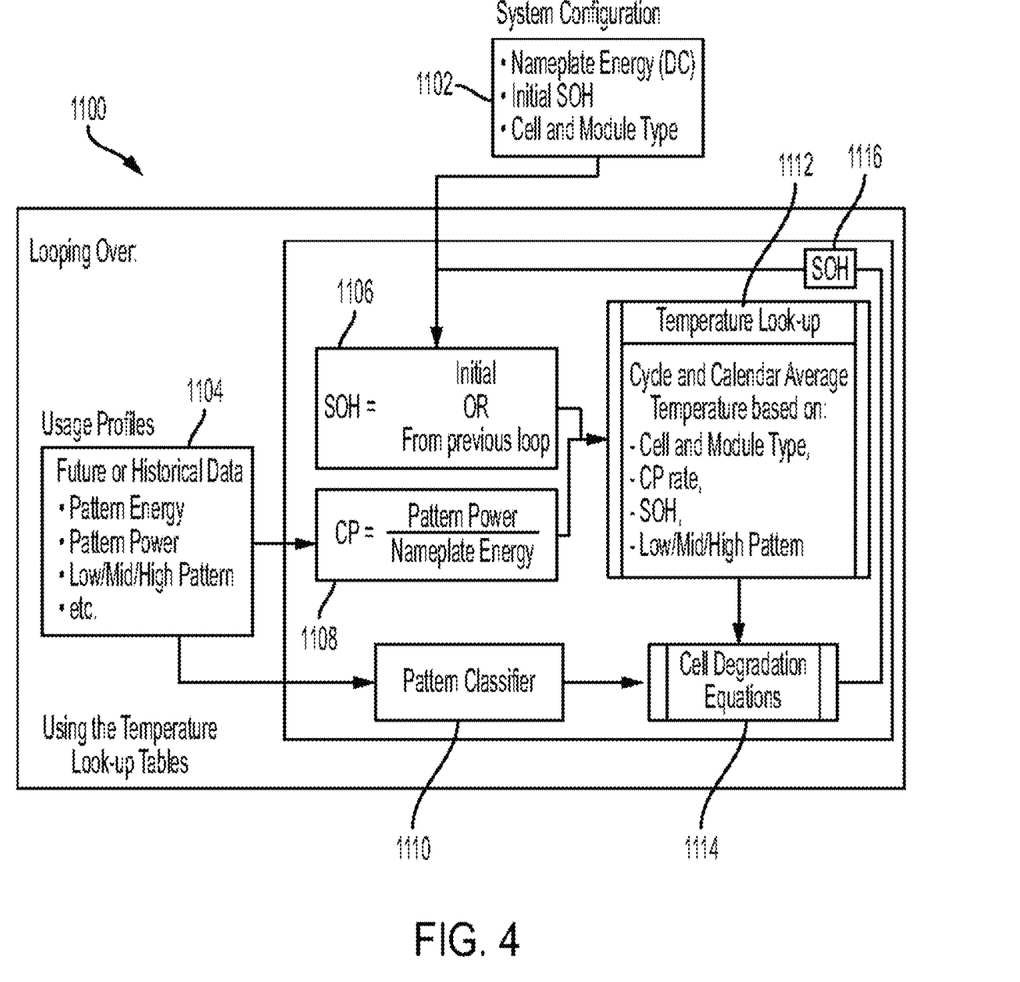
FIG. 4 is a flow diagram illustrating the implementation of a system and/or method for estimating battery degradation of a BESS in accordance with an aspect of the present disclosure.

FIG. 4 is a flow diagram 1100 illustrating the implementation of a system and/or method for estimating battery degradation of a BESS in accordance with an aspect of the present disclosure. The flow diagram 1100 may be implemented as iterative process over a pre-defined time period divided into a plurality of iterations (corresponding to time intervals). The pre-defined time period may be, for example, a day, a month, a year, five years, twenty years, although the present disclosure is not limited thereto, and may be defined as any unit of time. Each iteration of the plurality of iterations may correspond to a time interval being, for example, a minute, an hour, a day, a month, although the present disclosure is not limited thereto, and may be defined as any unit of time. In general, shorter iterations (time intervals) may produce more accurate SOH calculations while requiring more computing resources.

The BESS configuration 1102 may include rated (e.g., specified or nameplate) energy capacity (available in direct current [DC] before any conversion to alternating current [AC]), battery cell type and module type, and initial SOH. The calculations described herein may vary based on the parameters defined in the BESS configuration 1102, for example, the cell degradation equations 1114 and the thermal model 1206 (further described with respect to FIG. 5).

The usage profile 1104 may define the charging and discharging cycles of the BESS over the pre-defined time period, for example, the depth of discharge (DOD) (and therefore SOC) and charge rate (charging/discharging power) of the BESS for each iteration. In some cases, the usage profile 1104 over the pre-defined time period is derived from historical usage data of the BESS (for example, data from a commissioned BESS, which may then be used to predict future battery degradation by assuming that the trends of the past usage profile continue in the future). In some cases, the usage profile 1104 over the pre-defined time period is derived from future usage data of the BESS (for example, a user may upload data for a BESS that is not yet commissioned to predict future battery degradation). The usage profile 1104 may be classified as implementing a low usage pattern, a medium usage pattern, and/or a high usage pattern.

A low usage pattern may involve a relatively small depth of discharge (DOD) such that the state of charge (SOC) of the batteries is discharged by less than about 25% during the discharge cycles and charged by less than about 25% during the charge cycles, and/or may involve a relatively low charge rate such that the output power during the discharge cycles is less than about 25% of the rated power and the input power during the charge cycles is less than about 25% of the rated power.

A medium usage pattern may involve a relatively moderate DOD such that the SOC of the batteries is discharged by greater than about 25% and less than about 75% during the discharge cycles and charged by greater than about 25% and less than about 75% during the charge cycles, and/or may involve a relatively moderate charge rate such that the output power during the discharge cycles is greater than about 25% of the rated power and less than about 75% of the rated power and the input power during the charge cycles is greater than about 25% of the rated power and less than about 75% of the rated power.

A high usage pattern may involve a relatively large depth of discharge (DOD) such that the state of charge (SOC) of the batteries is discharged by greater than about 75% during the discharge cycles and charged by greater than about 75% during the charge cycles, and/or may involve a relatively high charge rate such that the output power during the discharge cycles is greater than about 75% of the rated power and the input power during the charge cycles is greater than about 75% of the rated power.

It is noted that the usage profile 1104 may combine aspects of the low, medium and high usage patterns. For example, in some cases, the batteries may be discharged significantly faster (e.g., greater than about 75% of the rated power) than the batteries are charged (e.g., less than about 25% of the rated power), which may preserve the SOH of the batteries by reducing temperature-based degradation.

Each iteration of the iterative process implemented in flow diagram 1100 may comprise determining (i.e., retrieving or referencing) an average temperature of the BESS by inputting a SOH 1106 for the current iteration and a charge rate 1108 for the current iteration into an average temperature LUT 1112. The average temperature LUT 1112 may be generated (i.e., constructed) before the execution of the iterative process of the flow diagram 1100, and may be a file storing table data (for example, CSV, XLS, XML, JSON, SQL, etc.). The generation of the LUT 1112 is described in further detail with respect to FIG. 5. The charge rate 1108 for the current iteration may be determined based on the usage profile 1104. Other than the first iteration, the SOH 1106 for the current iteration may be determined based on the output of cell degradation equations 1114.

For the first iteration, an initial SOH (e.g., 100%, or greater than about 95%) may be used for the SOH 1106. The initial SOH of the BESS may be measured by comparing the measured energy capacity to the rated (i.e., specified or nameplate) energy capacity, or the measured charge capacity to the rated charge capacity. For example, if the measured energy capacity is 500 MWh and the rated energy capacity is 525 MWh, the initial SOH may be about 95.2%.

Each iteration of the iterative process executed in the flow diagram 1100 may comprise inputting the average temperature determined from the LUT 1112 into a set of cell degradation equations 1114 to determine an SOH 1116 of the BESS for a next iteration of the plurality of iterations. Other than the first iteration (where the initial SOH is used), the SOH 1116 determined in the previous iteration becomes the SOH 1106 for the current iteration.

In one example, the set of degradation equations 1114 include an Arrhenius-based equation that models several chemical degradation processes (such as electrolyte decomposition, solid-electrolyte interphase layer growth, lithium plating, and transition metal dissolution) as a generalized equation:

$$\Delta SOH = \left(-k \cdot e^{-Ea/RT}\right)\Delta t$$

where $\Delta SOH$ is the change in state of health, $\Delta t$ is the length of time of the current iteration, k is a generalized rate constant, $E_a$ is a generalized activation energy, R is the universal gas constant, and T is the average temperature of the BESS for the current iteration determined from the LUT 1112. $E_a$ and k may be fitted parameters based on experimental data, and may reflect the average sensitivity of several temperature-dependent degradation processes. However, the Arrhenius-based equation approach may result in over-simplification since a single equation may not capture the nuanced behavior of individual degradation mechanisms. For example, some reactions may dominate at low temperatures (e.g., lithium plating) while other reactions may dominate at high temperatures (e.g., electrolyte degradation). Other examples of degradation equations 1114 may include empirical degradation models that directly link temperature to SOH loss and/or consider both cycling and calendar aging.

The steps of (1) determining an average temperature by inputting the SOH 1106 and the charge rate 1108 into the LUT 1112 and (2); inputting the determined average temperature into the set of cell degradation equations 1114 to determine the SOH 1116 may be repeated until a last iteration of the iterative process is executed.

In some cases, the SOH determined by the cell degradation equations 1114 is adjusted based on a pattern classifier 1110 (described in more detail with respect to FIG. 7), which may classify each iteration (time interval or data point) of the usage profile 1104 as a peak shifting (PS) interval, frequency regulation (FR) interval, or rest interval. Peak shifting involves charging the BESS during times of low grid demand (e.g., supply peak during the mid-day from solar energy) and discharging the BESS during times of high grid demand (e.g., demand peak during the evening). Frequency regulation involves adjusting the charging/discharging of the BESS to maintain the grid frequency at a stable level, typically 50 or 60 Hz, which prevents power disruptions. Since the BESS is charged and discharged frequently during an FR interval, the decrease in SOH may be more significant compared to a PS interval, and thus, the SOH output by the cell degradation equations 1114 may be adjusted more significantly (e.g., a larger SOH decrease) when the interval is a FR interval compared to a PS interval or a rest interval.

Figure 5:
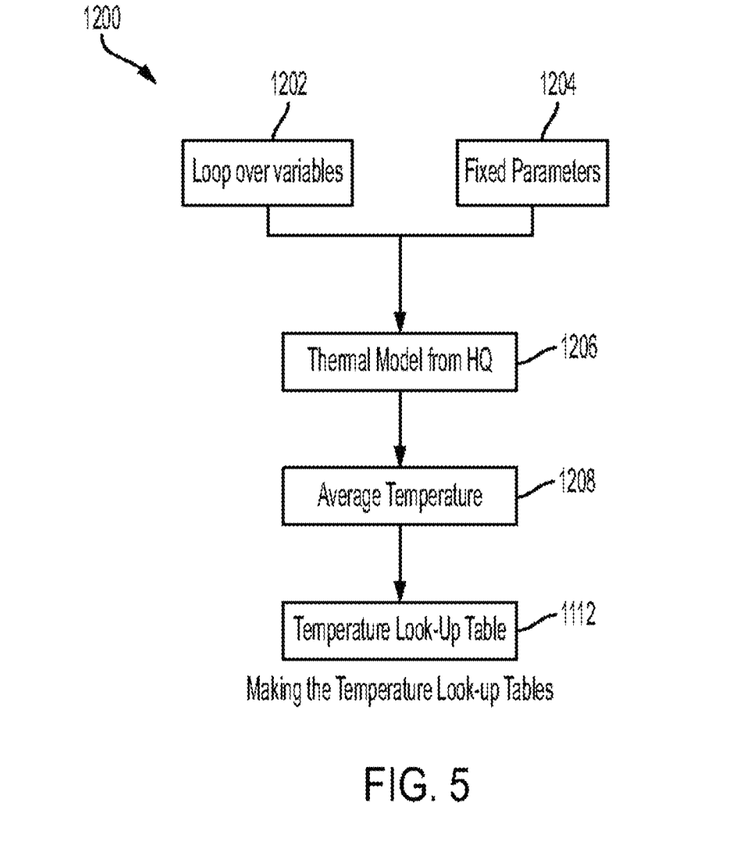
FIG. 5 is a flow diagram illustrating the generation of an average temperature look up table in accordance with an aspect of the present disclosure.

FIG. 5 is a flow diagram 1200 illustrating the generation (i.e., construction) of the average temperature LUT 1112 in accordance with an aspect of the present disclosure. Different combinations of input variables 1202 such as charge rate, SOH, and usage pattern (low/medium/high) may be input (e.g., looped over or iterated) into a thermal model 1206 to generate an average temperature 1208 for each combination, which may then be used to populate the LUT 1112. Additionally, constant parameters 1204 may be configured such as the period of time between charge and discharge (e.g., 2 hours) and the depth of discharge (e.g., 100%). In general, the average temperature 1208 becomes higher as the SOH becomes lower, the charge rate becomes higher, and the usage pattern is higher. The average temperature LUT 1112 may includes average cycling temperatures that consider charging and discharging cycles of the BESS (for example, when the charge rate is non-zero) and average resting temperatures based on time when the BESS is not undergoing charging and discharging cycles (for example, when the charge rate is zero).

The thermal model 1206 may model heat generation due to electrical losses and the ability to dissipate the heat. The charge rate affects the current flow, which contributes to heat generation through Joule heating ($I^2R$ losses), while SOH influences internal resistance, where a degraded battery (lower SOH) has higher internal resistance, leading to increased heat generation. The thermal model 1206 may calculate heat generation and may then use thermal capacitance and thermal resistance parameters to determine how the heat generation affects the battery's average temperature, factoring in ambient temperature and cooling mechanisms.

Figure 6:
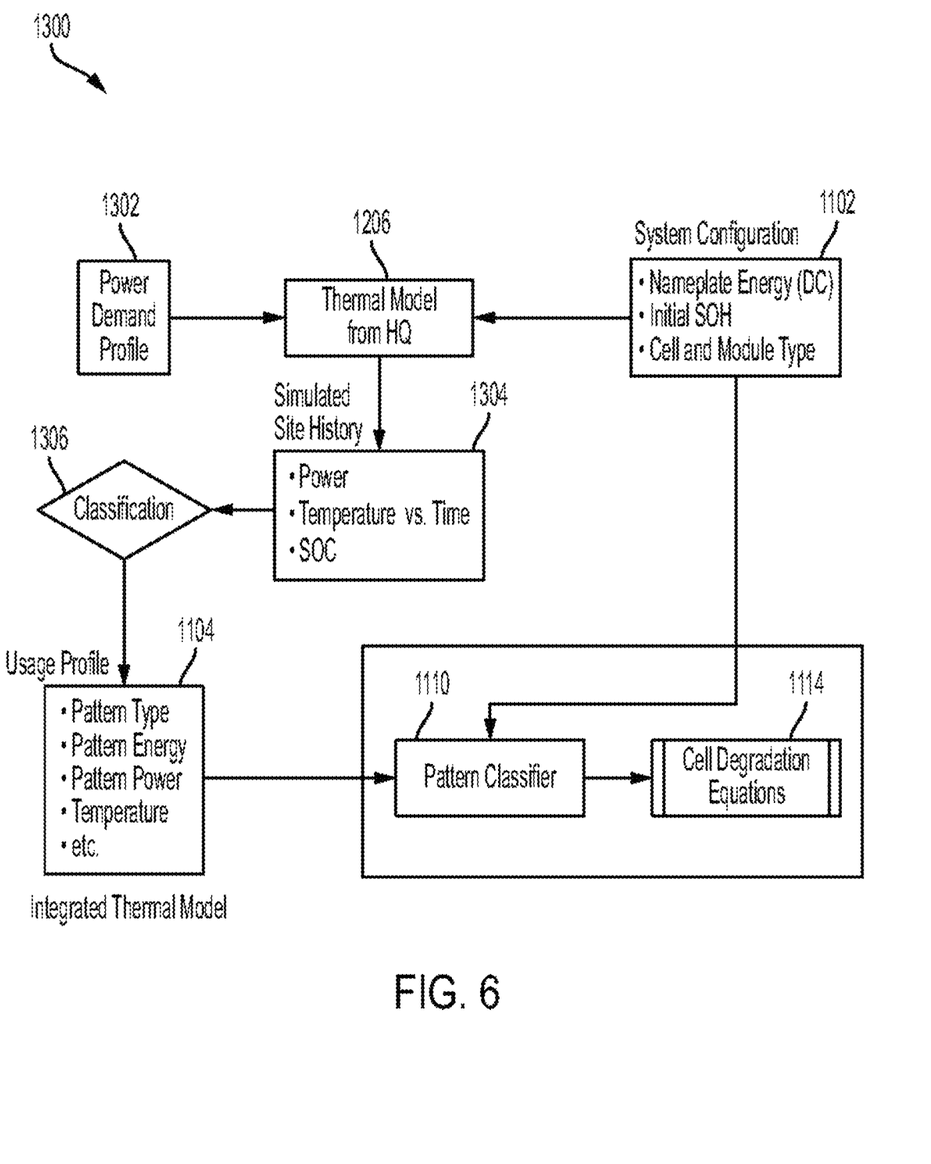
FIG. 6 is a flow diagram illustrating the implementation of a system and/or method for estimating battery degradation of a BESS in accordance with an aspect of the present disclosure.

FIG. 6 is a flow diagram 1300 illustrating the implementation of a system and/or method for estimating battery degradation of a BESS without using an average temperature look up table, in accordance with an aspect of the present disclosure. In this case, a power demand profile 1302 specifies the charging or discharging power of the battery over time, and the temperature is calculated directly using the thermal model 1206, resulting in a time series 1304 of power, temperature, and SOC. The time series 1304 then undergoes classification 1306 to determine the pattern type (e.g. peak shift, frequency regulation, or resting), which is used in the cell degradation equations 1114.

Figure 7:
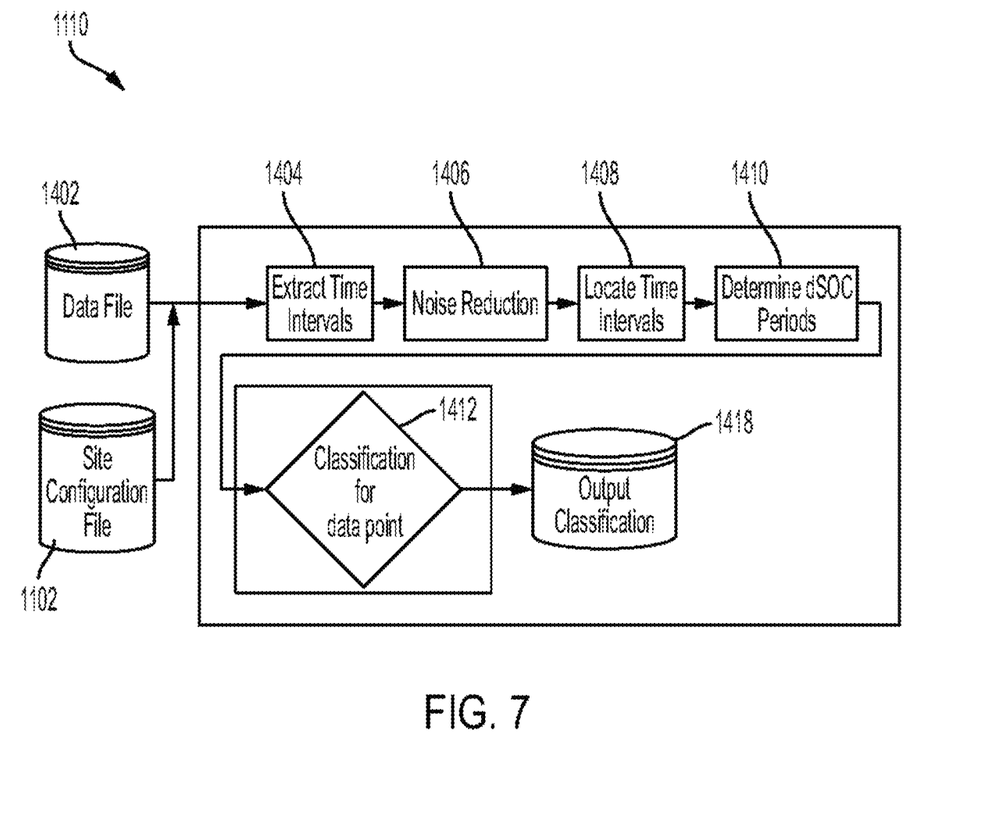
FIG. 7 is a flow diagram illustrating the implementation of a pattern classifier for classifying data points in a BESS usage profile as peak shifting, frequency regulation or rest in accordance with an aspect of the present disclosure.

FIG. 7 is a flow diagram illustrating the pattern classifier 1306, in accordance with an aspect of the present disclosure. A data file 1402 may include the BESS site average power, BESS site average SOC, and BESS maximum module temperature over a period of time (e.g., hours, days, months, etc.). The data file 1402 may be divided into a plurality of time intervals (e.g., where each time interval is 1 hours, 24 hours, etc.) which may correspond to the iterations described with respect to FIG. 4. The logic of the pattern classifier 1110 may vary based on the cell type or module type configured in the BESS configuration 1102. At step 1404, data for one time interval (e.g., 24 hours long) may be extracted, and the time interval may be further divided into sub-intervals (e.g., one minute long with 24*60=14440 sub-intervals). At step 1406, noise in the SOC data may be reduced, for example, changes of less than 1% SOC may be ignored. At step 1408, timepoints (e.g., sub-intervals) in the time interval where charging starts may be labeled as charging points. At step 1410, a period between two charging points that is greater than or equal to an SOC difference threshold may be labelled as a $\Delta SOC$ period. In some cases, the period may be labelled as a $\Delta SOC$ period when the SOC difference threshold is greater than or equal to about 5%, greater than or equal to about 10%, greater than or equal to about 15%, greater than or equal to about 20%, greater than or equal to about 25%, greater than or equal to about 30%, greater than or equal to about 35%, greater than or equal to about 40%, greater than or equal to about 45%, or greater than or equal to about 50%, however the present disclosure is not limited thereto. At step 1412, the data for each sub-interval may be classified as a rest interval, a PS interval or a FR interval. For example, if the maximum SOC and minimum SOC are equal over a sub-interval (e.g., over one minute), the sub-interval may be classified as a rest interval. If the sub-interval is within a ΔSOC period, the sub-interval may be classified as a PS interval. If the sub-interval is neither a rest interval or a PS interval, the sub-interval may be classified as an FR interval. The output pattern classification 1418 may then be used to adjust the cell degradation equations 1114.

Figure 8:
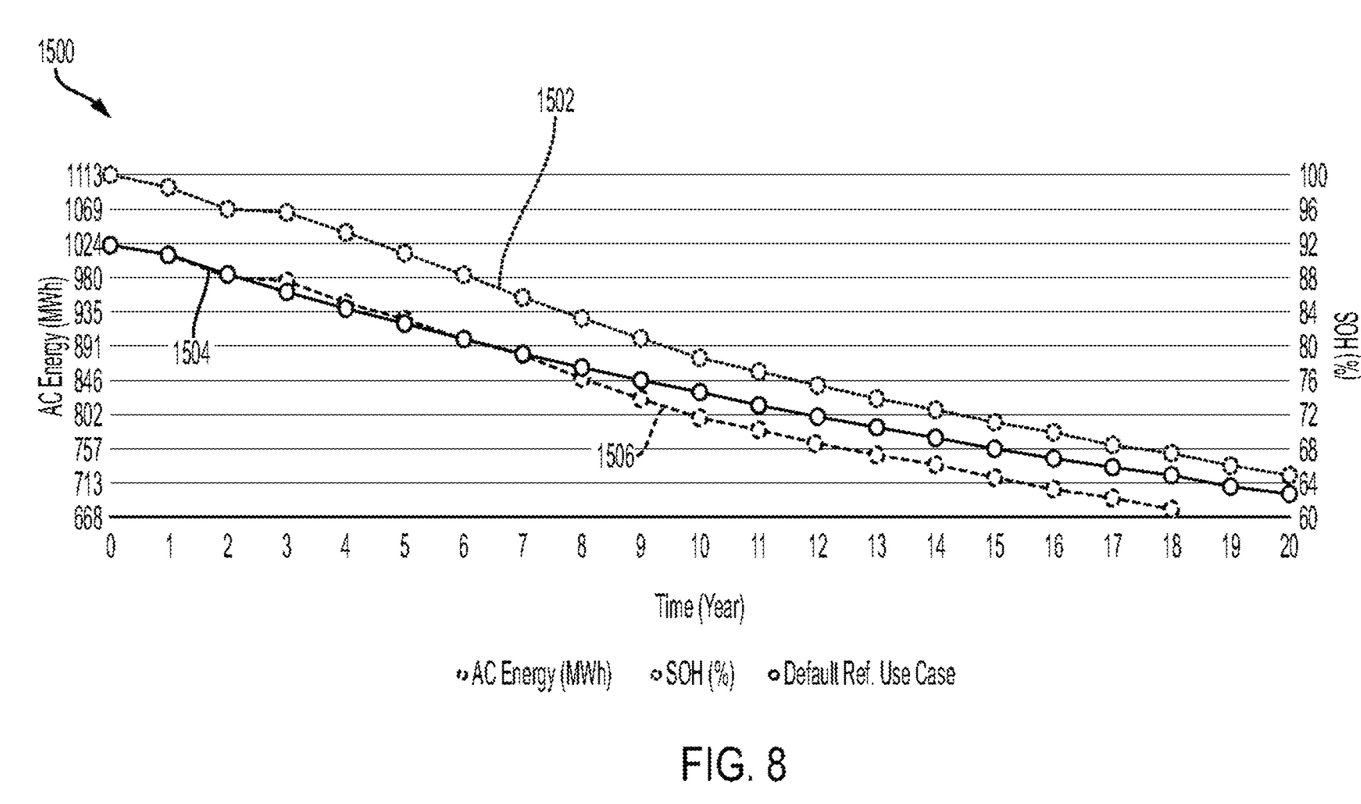
FIG. 8 is a graph showing the estimation of SOH of a BESS over a period of time in accordance with an aspect of the present disclosure.

FIG. 8 is a graph 1500 showing the estimation of SOH of a BESS as a time series in accordance with an aspect of the present disclosure. The horizontal axis may represent time (e.g., in years) and the vertical axis may represent SOH (e.g., in %) and AC energy (electricity output to the grid after conversion of DC electricity to AC; e.g., in MWh). The SOH values 1116 determined in the iterative process described with respect to FIG. 4 may be displayed on the curve 1502. The AC energy corresponding to SOH values of the curve 1502 may be displayed on the curve 1506. Reference SOH values may be displayed on the curve 1504 (for comparison purposes). In some cases, a user interface (e.g., a monitor) may display the graph 1500.

Figure 9:
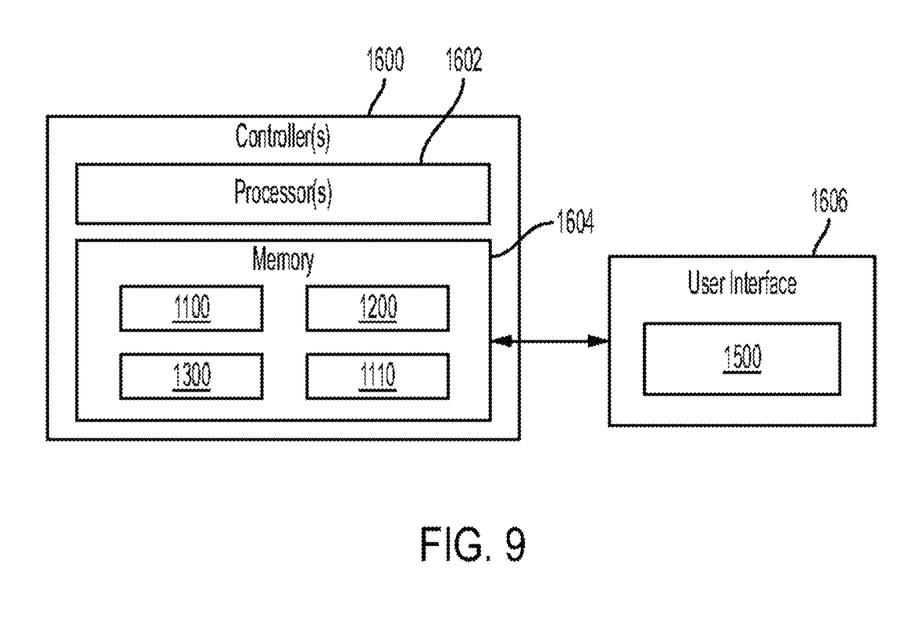
FIG. 9 is a schematic of a controller implementing the systems and/or methods for estimating battery degradation of a BESS in accordance with an aspect of the present disclosure.

FIG. 9 is a schematic diagram illustrating one or more controllers 1600 implementing the systems and/or methods described with respect to FIGS. 4-8, in accordance with an aspect of the present disclosure.

The controller(s) 1600 may include one or more processors 1602 (i.e., processing modules) configured to execute program instructions maintained on a memory 1604 (i.e., memory module(s)). In this regard, the processor(s) 1602 of controller(s) 1600 may execute any of the various methods, processes, steps, logic flows, and/or algorithms described throughout the present disclosure, for example, the flow charts 1100 and 1300 implementing the system and/or method for estimating battery degradation of a BESS described with respect to FIGS. 4 and 6, the flow chart 1200 implementing the generation of the LUT described with respect to FIG. 5, the pattern classifier 1110 described with respect to FIG. 7, and the display of the graph 1500 described with respect to FIG. 8.

The controller 1600 (i.e., computing device) may comprise a desktop computer, mainframe computer system, workstation, image computer, parallel processor, or any other computer system (e.g., networked computer). The one or more processors 1602 of the controller 1600 may include any processing element known in the art. In this sense, the one or more processors 1602 may include any microprocessor-type device configured to execute algorithms and/or instructions, for example, application specific integrated circuit (ASIC), field programmable gate array (FPGA), parallel processor, graphics processing unit (GPU), central processing unit (CPU), other chipsets, a logical circuit, and/or an electronic processor. It is further recognized that the term "processor" may be broadly defined to encompass any device having one or more processing elements, which execute program instructions from a non-transitory memory 1604. Further, the steps described throughout the present disclosure may be performed by a single controller 1600 or, alternatively, multiple controllers. Additionally, the controller 1600 may include one or more controllers housed in a common housing or within multiple housings. In this way, any controller or combination of controllers may be separately packaged as a module suitable for integration into a BESS.

The memory 1604 may include any storage medium known in the art suitable for storing program instructions executable by the associated one or more processors 1602. For example, the memory 1604 may include a non-transitory memory medium. By way of another example, the memory medium 1604 may include, but is not limited to, a read-only memory, a random access memory, a magnetic or optical memory device (e.g., disk), a magnetic tape, a solid state drive, etc. It is further noted that memory 1604 may be housed in a common controller housing with the processor(s) 1602. In some cases, the memory 1604 may be located remotely with respect to the physical location of the processors 1602 and controller 1600. For instance, the one or more processors 1602 of controller 1600 may access a remote memory (e.g., server or cloud), accessible through a network (e.g., internet, intranet and the like).

The systems and/or methods associated with the flowcharts 1100, 1200, 1300, and 1110 may be implemented as computer programs stored in the memory 1604. A computer program (also known as a program, program instructions, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with a user, embodiments of the subject matter described in this specification (such as the graph 1500) may be displayed on a user interface 1606, such as a display device, e.g., a CRT (cathode ray tube) or LCD (liquid crystal display) monitor, for displaying information to the user and a keyboard and a pointing device, e.g., a mouse or a trackball, by which the user can provide input to the computer.

In the above, the present disclosure has been described in more detail through the drawings and aspects. However, the configurations described in the drawings or the aspects in the specification are merely aspects of the present disclosure and do not represent all the technical ideas of the present disclosure. Thus, it is to be understood that there may be various equivalents and variations in place of them at the time of filing the present application which are encompassed by the claims.

What is claimed is:

1. A system for estimating battery degradation of a battery energy storage system (BESS), comprising:
   one or more controllers comprising one or more processing modules and one or more non-transitory memory storage modules storing computing instructions which when executed by the one or more processing modules is configured to:
   (a) execute an iterative process over a pre-defined time period, wherein the pre-defined time period is divided into a plurality of iterations, wherein each iteration of the plurality of iterations comprises:
      (1) determine an average temperature of the BESS for a current iteration of the plurality of iterations by inputting the following into an average temperature look-up table (LUT): a state of health (SOH) of the BESS for the current iteration and a charge rate of the BESS for the current iteration; and (2) input the determined average temperature into a set of cell degradation equations to determine a SOH of the BESS for a next iteration of the plurality of iterations; and (b) manage a usage profile for charging and discharging the BESS based at least partially on the SOH determined for each iteration over the pre-defined time period.

2. The system of claim 1, wherein the average temperature LUT is generated by inputting different combinations of SOH and charge rate into a thermal model.

3. The system of claim 1, wherein the one or more controllers is configured to:
repeat steps (1) and (2) until a last iteration of the iterative process is executed.

4. The system of claim 1, wherein the one or more controllers is configured to:
instruct a user interface (UI) to display a time series showing the SOH determined for each iteration over the pre-defined time period, wherein a horizontal axis of the time series represents time and a vertical axis of the time series represents SOH.

5. The system of claim 1, wherein the SOH for the first iteration is an initial SOH of the BESS.

6. The system of claim 1, wherein the charge rate of the BESS for the current iteration is determined based on the usage profile of the BESS over the pre-defined time period and a rated energy capacity of the BESS.

7. The system of claim 6, wherein the usage profile of the BESS over the pre-defined time period is derived from historical usage data of the BESS.

8. The system of claim 6, wherein the usage profile of the BESS over the pre-defined time period is derived from future usage data of the BESS.

9. The system of claim 1, wherein the average temperature LUT includes average cycling temperatures that consider charging and discharging cycles of the BESS and average resting temperatures based on time when the BESS is not undergoing charging and discharging cycles.

10. The system of claim 1, wherein the average temperature LUT for the current iteration is generated based on a cell type and a module type of the BESS.

11. A method for estimating battery degradation of a battery energy storage system (BESS), comprising:
(a) executing an iterative process over a pre-defined time period, wherein the pre-defined time period is divided into a plurality of iterations, wherein each iteration of the plurality of iterations comprises:
(1) determining an average temperature of the BESS for a current iteration of the plurality of iterations by inputting the following into an average temperature look-up table (LUT): a state of health (SOH) of the BESS for the current iteration and a charge rate of the BESS for the current iteration; and
(2) inputting the determined average temperature into a set of cell degradation equations to determine a SOH of the BESS for a next iteration of the plurality of iterations; and (b) managing a usage profile for charging and discharging the BESS based at least partially on the SOH determined for each iteration over the pre-defined time period.

12. The method of claim 11, wherein the average temperature LUT is generated by inputting different combinations of SOH and charge rate into a thermal model.

13. The method of claim 11, further comprising:
repeating steps (1) and (2) until a last iteration of the iterative process is executed.

14. The method of claim 11, further comprising:
instructing a user interface (UI) to display a time series showing the SOH determined for each iteration over the pre-defined time period, wherein a horizontal axis of the time series represents time and a vertical axis of the time series represents SOH.

15. The method of claim 11, wherein the SOH for the first iteration is an initial SOH of the BESS.

16. The method of claim 11, wherein the charge rate of the BESS for the current iteration is determined based on the usage profile of the BESS over the pre-defined time period and a rated energy capacity of the BESS.

17. The method of claim 16, wherein the usage profile of the BESS over the pre-defined time period is derived from historical usage data of the BESS.

18. The method of claim 16, wherein the usage profile of the BESS over the pre-defined time period is derived from future usage data of the BESS.

19. The method of claim 11, wherein the average temperature LUT includes average cycling temperatures that consider charging and discharging cycles of the BESS and average resting temperatures based on time when the BESS is not undergoing charging and discharging cycles.

20. The method of claim 11, wherein the BESS is configured to store renewable electricity generated by solar power or wind power in order to reduce reliance on fossil fuel-based power generation and mitigate climate change effects.

* * * * *